United States Patent
Baba et al.

(10) Patent No.: US 9,874,768 B2
(45) Date of Patent: Jan. 23, 2018

(54) OPTICAL MODULATION DEVICE

(71) Applicants: FUJITSU LIMITED, Kawasaki-shi, Kanagawa (JP); Photonics Electronics Technology Research Association, Bunkyo-ku, Tokyo (JP)

(72) Inventors: Takeshi Baba, Tsukuba (JP); Tatsuya Usuki, Tsukuba (JP); Suguru Akiyama, Tsukuba (JP)

(73) Assignees: FUJITSU LIMITED, Kawasaki (JP); PHOTONICS ELECTRONICS TECHNOLOGY RESEARCH ASSOCIATION, Tokyo (JP)

(*) Notice: Subject to any disclaimer, the term of this patent is extended or adjusted under 35 U.S.C. 154(b) by 0 days.

(21) Appl. No.: 15/463,177

(22) Filed: Mar. 20, 2017

(65) Prior Publication Data
US 2017/0285372 A1 Oct. 5, 2017

(30) Foreign Application Priority Data
Mar. 30, 2016 (JP) ................... 2016-068193

(51) Int. Cl.
G02F 1/01 (2006.01)
G02F 1/025 (2006.01)
G02F 1/225 (2006.01)
G02F 1/21 (2006.01)
G02F 1/015 (2006.01)

(52) U.S. Cl.
CPC ............ *G02F 1/0121* (2013.01); *G02F 1/025* (2013.01); *G02F 1/2257* (2013.01); *G02F 2001/0152* (2013.01); *G02F 2001/212* (2013.01)

(58) Field of Classification Search
CPC ................... G02F 1/2257; G02F 2001/212
See application file for complete search history.

(56) References Cited

PUBLICATIONS

S. Spector, et al.; "Compact Carrier Injection Based Mach-Zehnder Modulator in Silicon;" presented at the Integr. Photon. Nanophoton. Res. Appl. Conf.; Salt Lake City, UT; Paper ITuES; (3 Sheets) 2007/p. 1 of specification.
F. Gan, et al.; "Compact, Low-Power, High-Speed Silicon Electro-Optic Modulator;" Conference on Lasers and Electro-Optics (CLEO); CTuQ6; (2 Sheets) 2007/p. 2 of specification.
T. Baba, et al.; "25-Gb/s broadband silicon modulator with 0.31-V•cm V-πL based on forward-biased PIN diodes embedded with passive equalizer;" Optics Express; vol. 23; Issue 26; pp. 32950-32960 (11 Sheets); 2015/p. 2 of specification.
T. Usuki; "Robust Optical Data Transfer on Silicon Photonic Chip;" Journal of Lightwave Technology; vol. 30, No. 18; pp. 2933-2940 (8 Sheets); Sep. 15, 2012.

*Primary Examiner* — Omar R Rojas
(74) *Attorney, Agent, or Firm* — Kratz, Quintos & Hanson, LLP

(57) ABSTRACT

An optical modulation device includes: an optical waveguide formed above a substrate; a phase modulator disposed on part of the optical waveguide; a capacitor connected to the phase modulator and including a lower electrode and an upper electrode; a resistor connected in parallel to the capacitor; and an appended part integrated with the upper electrode and electrically connected to the resistor, wherein the appended part is smaller in area than the capacitor (upper electrode).

4 Claims, 8 Drawing Sheets

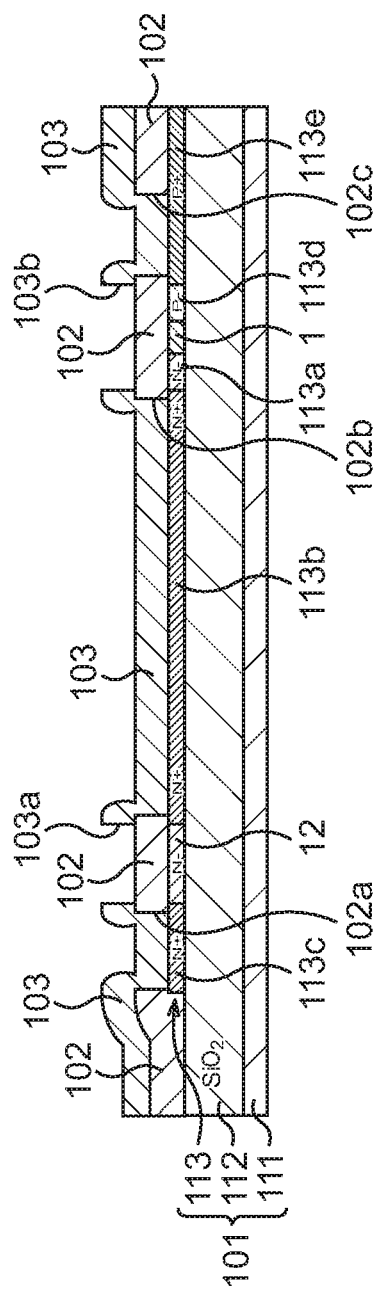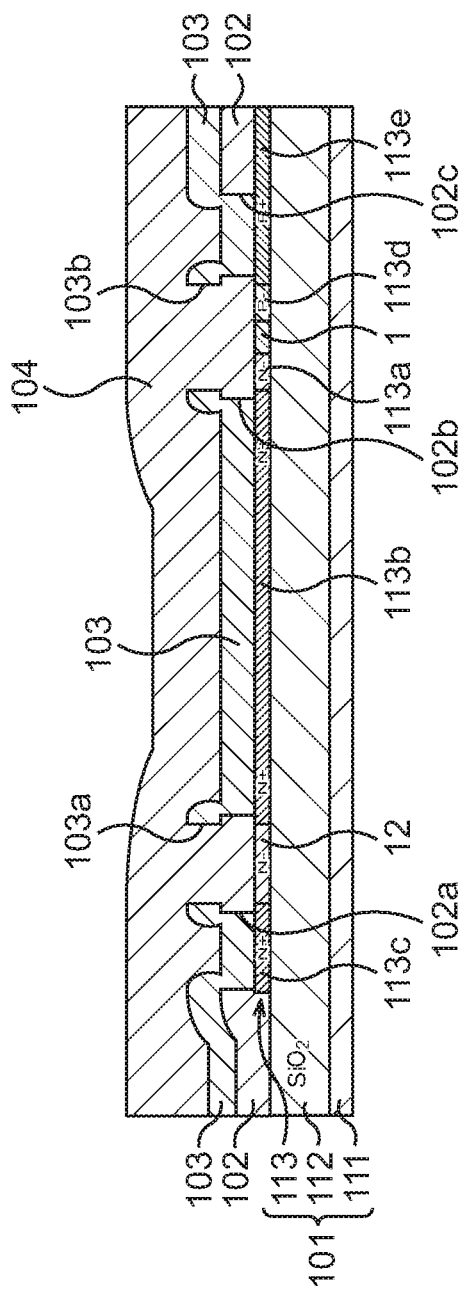
FIG. 3A
FIG. 3B

OPTICAL MODULATION DEVICE

CROSS-REFERENCE TO RELATED APPLICATION

This application is based upon and claims the benefit of priority of the prior Japanese Patent Application No. 2016-068193, filed on Mar. 30, 2016, the entire contents of which are incorporated herein by reference.

FIELD

The embodiments discussed herein are directed to an optical modulation device.

BACKGROUND

In recent years, the development has increasingly been made on next-generation optical interconnect technology using integrated optical devices that are fabricated using silicon. In this technology, the optical devices such as an optical waveguide, a wavelength demultiplexer, and a light receiver which are fabricated using silicon are collectively integrated on one substrate.

Non-patent Document 1: Spector, S. et al., "Compact carrier injection based Mach-Zehnder modulator in silicon", presented at the Integr. Photon. Nanophoton. Res. Appl. Conf., Salt Lake City, Utah, Paper ITuE5, 2007.

Non-patent Document 2: Gan, F. et al., "Compact, Low-Power, High-Speed Silicon Electro-Optic Modulator", Conference on Lasers and Electro-Optics (CLEO), CTuQ6, 2007.

Non-patent Document 3: Baba, T. et al., "25–Gb/s broadband silicon modulator with 0.31–V·cm V$\pi$L based on forward-biased PIN diodes embedded with passive equalizer", *Optics Express*, Vol. 23, Issue 26, pp. 32950-32960, 2015.

SUMMARY

The optical modulator out of the aforesaid optical devices is driven by a voltage applied thereto and thus needs to have the electrodes on its optical waveguide. A PN diode in a phase modulator using a Si carrier plasma effect typically has a small junction capacitance of about several ten to about several hundred fF. A forward-biased PIN diode typically has a large junction capacitance of about several to about several ten pF. When an equalizer for frequency response compensation is mounted, the resultant capacitance becomes typically about several ten to several hundred fF smaller than the aforesaid junction capacitance.

The aforesaid junction capacitance is equal to the capacitance between the electrode formed on the substrate and the substrate. Accordingly, an inputted high-frequency current does not flow toward the equalizer but undesirably leaks to the outside through the capacitance between the electrode and the substrate.

In one aspect, an optical modulation device includes: a substrate; an optical waveguide formed above the substrate; a phase modulator disposed on part of the optical waveguide; a capacitor connected to the phase modulator and including a lower electrode and an upper electrode; a resistor connected in parallel to the capacitor; and an appended part integrated with the upper electrode and connected to the resistor, wherein the appended part is smaller in area than the capacitor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A and FIG. 3B are schematic cross-sectional views illustrating sequential processes subsequent to the process in FIG. 2D of the method of manufacturing the optical modulation device according to the first embodiment;

DESCRIPTION OF EMBODIMENTS

Figure 1A:
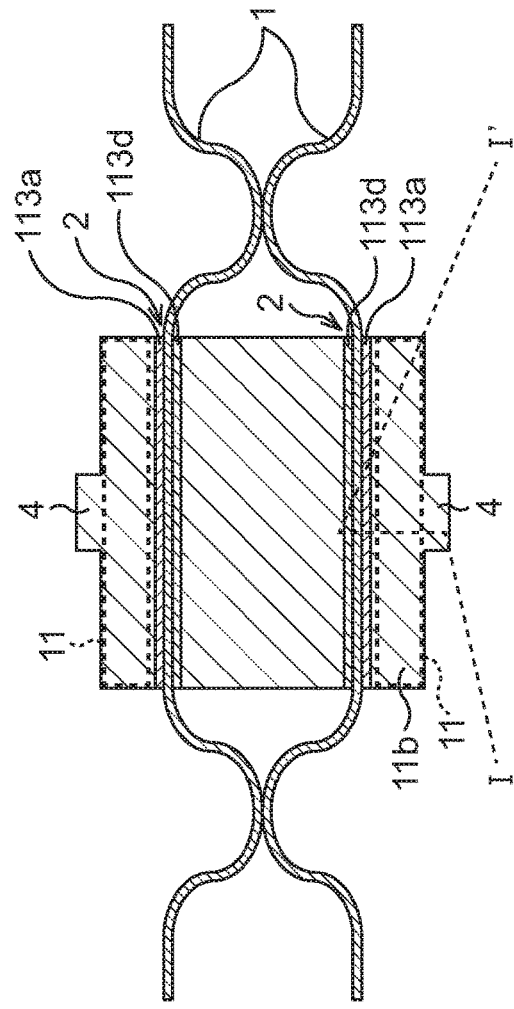
FIG. 1A and FIG. 1B are schematic views illustrating the rough structure of an optical modulation device according to one embodiment.

Embodiments will be hereinafter described in detail with reference to the drawings. In the following embodiments, the structure of an optical modulation device and a method of manufacturing the optical modulation device will be described.

In the drawings, some constituent members are not depicted with relatively accurate size and thickness for convenience of illustration.

First Embodiment

Figure 1B:
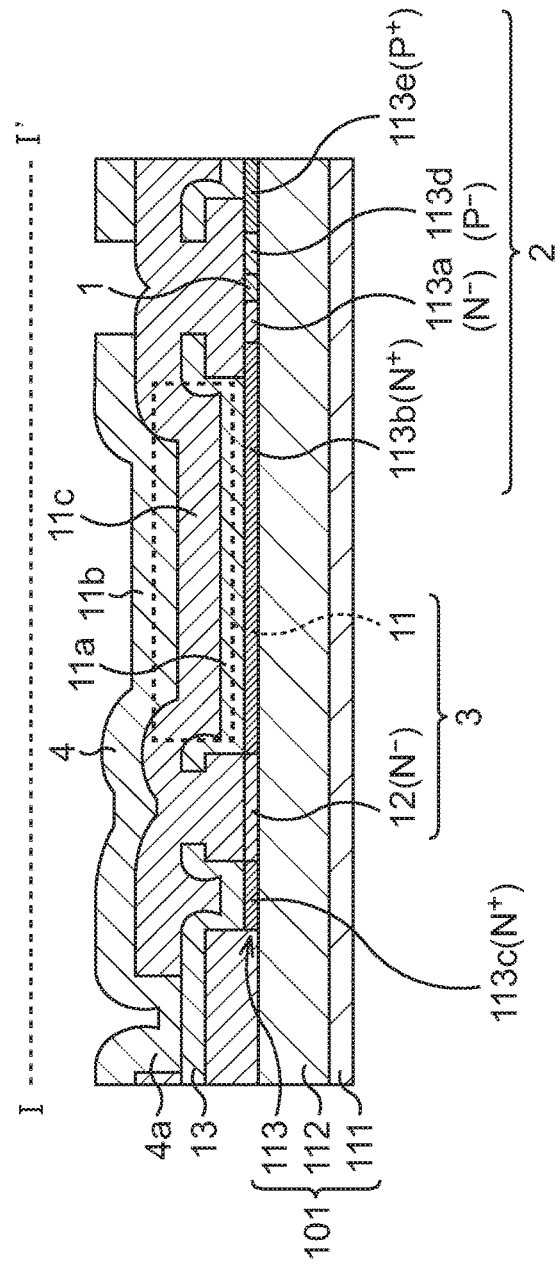

FIG. 1A is a schematic plane view illustrating the rough structure of an optical modulation device according to a first embodiment and FIG. 1B is a cross-sectional view taken along the broken line I-I' in FIG. 1A.

Structure of Optical Modulation Device

The optical modulation device includes: optical waveguide cores 1 constituting both arms of a Mach-Zehnder modulator; phase modulators 2 each provided on part of the optical waveguide core 1 and including a PIN diode; and structures 3 having an equalizer function.

The structures 3, which are for frequency response compensation, each include a capacitor 11 and a resistor 12 which is connected in parallel to the capacitor 11 and flattens a low-band frequency response.

The capacitor 11 is a parallel-plate capacitor and includes a lower electrode 11a, an upper electrode 11b, and a dielectric film 11c inserted between the lower and upper electrodes 11a, 11b. The lower and upper electrodes 11a, 11b are each formed of a conductive substance, for example, Al.

The optical waveguide cores 1, the phase modulators 2, and the resistors 12 are on a silicon layer 113 of a SOI substrate 101 (a stack of a silicon substrate 111, an insulating layer 112, and the silicon layer 113). In this embodiment, a side-wall grating optical waveguide is illustrated as an example of an optical waveguide including the optical waveguide core 1 and the phase modulator 2. The optical waveguide may be a rib optical waveguide instead of the side-wall grating optical waveguide.

The optical waveguide core 1 is a non-doped region of the silicon layer 113. An N-type region and a P-type region, which sandwich the optical waveguide core 1, are formed of impurities implanted into the silicon layer 113. The N-type region includes a low-concentration N-type region 113a, a high-concentration N-type region 113b, a low-concentration N-type region as the resistor 12, and a high-concentration N-type region 113c. The P-type region includes a low-concentration P-type region 113d and a high-concentration P-type region 113e. The phase modulator 2 includes the low-concentration N-type region 113a (fin-shaped), the high-concentration N-type region 113b, the low-concentration P-type region 113d (fin-shaped), and the high-concentration P-type region 113e. In the optical waveguide core 1 and the phase modulator 2, PIN junction is formed.

In this embodiment, appended parts 4 are formed integrally with the respective upper electrodes 11b of the capacitors 11. The appended parts 4 are each formed of the same material as that of the upper electrode 11b and are each electrically connected to the resistor 12. The appended parts 4 each have a smaller area than the area of the capacitor 11 (for example, the area of the upper electrode 11b, which is equal in area to the lower electrode 11a in the capacitor 11). Specifically, the capacitor 11 has an about 250 µm lateral length which is equal to that of the phase modulator 2, and has an about 60 µm vertical length. On the other hand, the appended part 4 has an about 10 µm lateral length and an about 3 µm vertical length. A conductive layer 13 is connected to the resistor 12. The appended part 4 includes a connection portion 4a connected to the conductive layer 13, for electrical connection to the resistor 12.

Since the appended part 4 is smaller than the capacitor 11, the capacitance generated between the appended part 4 and the SOI substrate 101 is sufficiently smaller than the capacitance of the capacitor 11, ensuring that an inputted high-frequency current flows toward the resistor 12. This reduces a loss of the high-frequency current.

Method of Manufacturing Optical Modulation Device

A method of manufacturing the optical modulation device according to the first embodiment will be hereinafter described.

FIG. 2A to FIG. 4B are schematic cross-sectional views illustrating sequential processes of the method of manufacturing the optical modulation device according to the first embodiment.

Figure 2A:
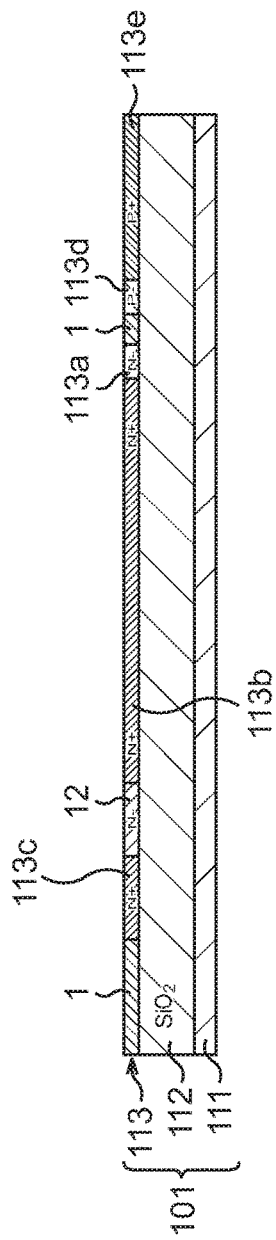
FIG. 2A to FIG. 2D are schematic cross-sectional views illustrating sequential processes of a method of manufacturing the optical modulation device according to the first embodiment.

First, as illustrated in FIG. 2A, the optical waveguide core 1, the low-concentration N-type region 113a, the high-concentration N-type region 113b, the resistor 12, the high-concentration N-type region 113c, the low-concentration P-type region 113d, and the high-concentration P-type region 113e are formed.

In detail, the SOI substrate 101 (the stack of the silicon substrate 111, the insulating layer 112, and the silicon layer 113) is prepared and the impurities are ion-implanted into the silicon layer 113 (about 0.22 µm thick). N-type impurities, which are, for example, phosphorus (P), are ion-implanted such that the low-concentration (N) regions have an about $1\times10^{18}/cm^3$ concentration and the high-concentration (N$^+$) regions have an about $1\times10^{20}/cm^3$ concentration. P-type impurities, which are, for example, boron (B), are ion-implanted such that the low-concentration (P) region has an about $1\times10^{18}/cm^3$ concentration and the high-concentration (P$^+$) region has an about $1\times10^{20}/cm^3$ concentration.

Consequently, in the silicon layer 113, the low-concentration N-type region 113a, the high-concentration N-type region 113b, the resistor 12, and the high-concentration N-type region 113c are formed in sequence on the left of the non-doped optical waveguide core 1. The low-concentration P-type region 113d and the high-concentration P-type region 113e are formed in sequence on the right of the non-doped optical waveguide core 1 in the silicon layer 113.

Figure 2B:
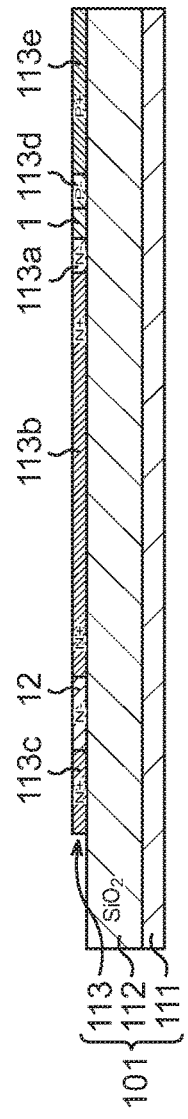

Subsequently, as illustrated in FIG. 2B, the silicon layer 113 is processed.

In detail, the silicon layer 113 is processed into a predetermined shape by lithography and dry etching. Consequently, the optical waveguide core 1 constituting the arm of the Mach-Zehnder modulator is formed, and the phase modulator 2 is formed on part of both sides of the optical waveguide core 1 as illustrated in FIG. 1A and FIG. 1B. The phase modulator 2 includes the low-concentration N-type region 113a (fin-shaped), the high-concentration N-type region 113b, the low-concentration P-type region 113d (fin-shaped), and the high-concentration P-type region 113e.

Figure 2C:
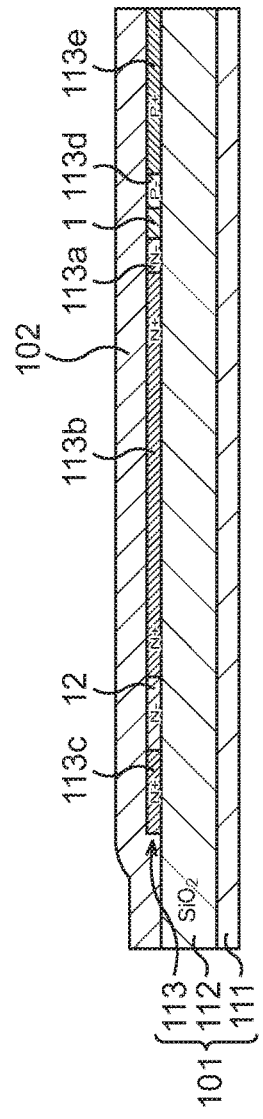

Subsequently, as illustrated in FIG. 2C, a first insulating layer 102 is formed.

In detail, an insulator, for example, SiO$_2$, is deposited on the insulating layer 112 and the silicon layer 113 to, for example, an about 0.5 µm thickness by, for example, a CVD method. Consequently, the first insulating layer 102 covering the silicon layer 113 and functioning as a clad layer is formed.

Figure 2D:
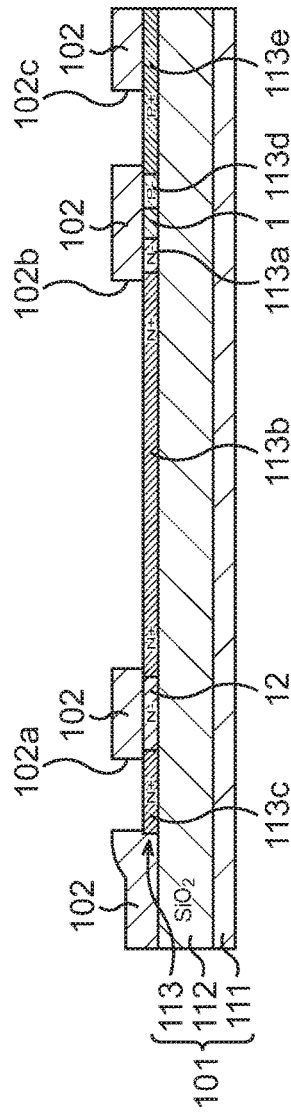

Subsequently, as illustrated in FIG. 2D, openings 102a, 102b, 102c are formed in the first insulating layer 102.

In detail, the opening 102a from which a surface of the high-concentration N-type region 113c is exposed, the opening 102b from which a surface of the high-concentration N-type region 113b is exposed, and the opening 102c from which a surface of the high-concentration P-type region 113e is exposed are formed in the first insulating layer 102 by lithography and dry etching.

Subsequently, as illustrated in FIG. 3A, a first conductive layer 103 is formed and processed.

In detail, first, a conductive substance, for example, Al is deposited on the silicon layer 113 and the first insulating layer 102 to, for example, an about 0.5 µm thickness by, for example, a sputtering method. Consequently, the first conductive layer 103 filling the openings 102a, 102b, 102c of the first insulating layer 102 is formed.

Subsequently, grooves 103a, 103b are formed in the first conductive layer 103 by lithography and dry etching to divide the first conductive layer 103. In the divided first conductive layer 103, its portion filling the opening 102a and extending on the first insulating layer 102 becomes the conductive layer 13 in FIG. 1B, and its portion filling the opening 102b becomes the lower electrode 11a in FIG. 1B.

Subsequently, as illustrated in FIG. 3B, a second insulating layer 104 is formed.

In detail, an insulator, for example, SiO$_2$, is deposited to, for example, an about 1.0 µm thickness by, for example, a CVD method to cover the divided first conductive layer 103. Consequently, the second insulating layer 104 functioning as a clad layer is formed. The second insulating layer 104 covers the first conductive layer 103, and its portions in the grooves 103a, 103b are in contact with the first insulating layer 102.

Figure 4A:
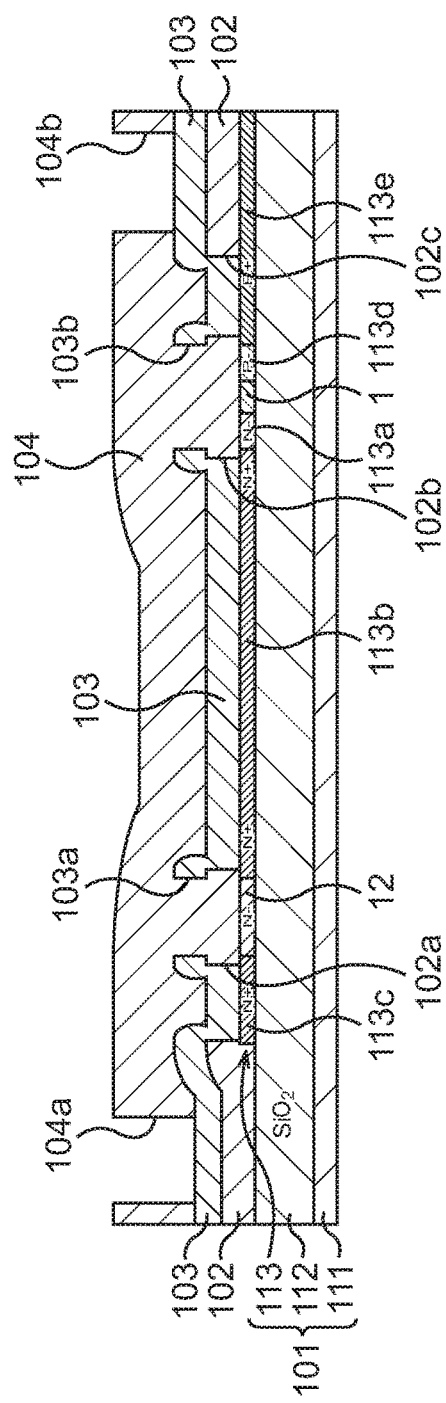
FIG. 4A and FIG. 4B are schematic cross-sectional views illustrating sequential processes subsequent to the process in FIG. 3B of the method of manufacturing the optical modulation device according to the first embodiment.

Subsequently, as illustrated in FIG. 4A, openings 104a, 104b are formed in the second insulating layer 104.

In detail, the opening 104a from which a surface of the first conductive layer 103 (the conductive layer 13 in FIG. 1B) is exposed and the opening 104b from which a surface of the first conductive layer 103 (its portion connected to the high-concentration P-type region 113e) is exposed are formed in the second insulating layer 104 by lithography and dry etching.

Figure 4B:
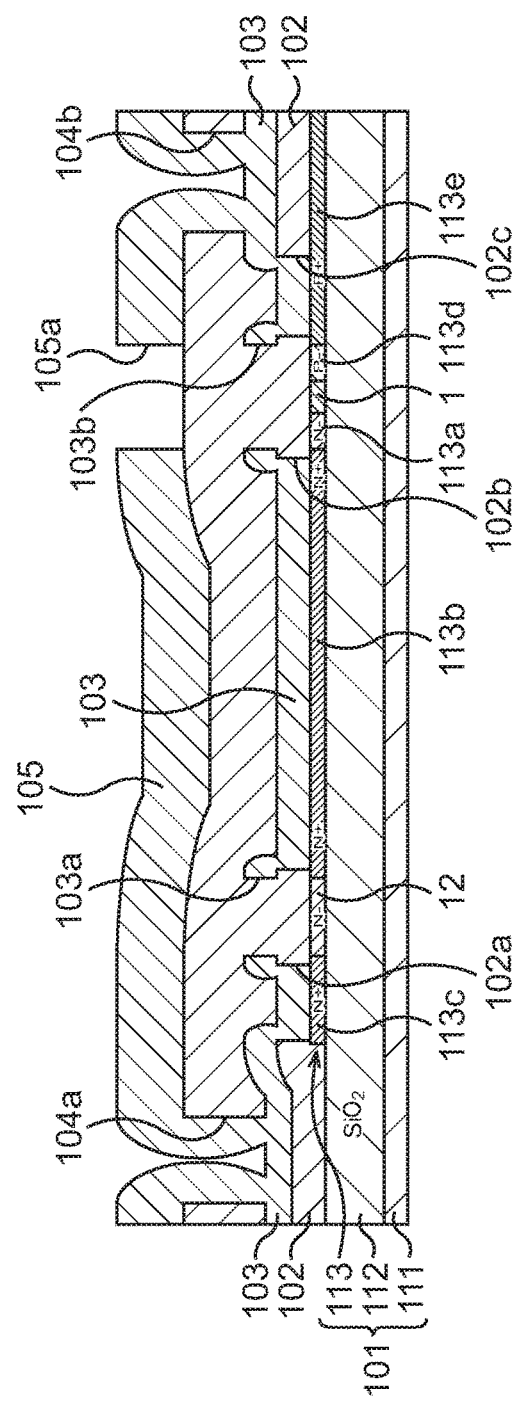

Subsequently, as illustrated in FIG. 4B, a second conductive layer 105 is formed and processed.

In detail, first, a conductive substance, for example, Al, is deposited to, for example, an about 1.0 µm thickness by, for example, a sputtering method to fill the openings 104a, 104b and cover the second insulating layer 104. Consequently, the second conductive layer 105 filling the openings 104a, 104b of the second insulating layer 104 is formed.

Next, a groove 105a is formed in the second conductive layer 105 by lithography and dry etching to divide the second conductive layer 105. In the divided second conductive layer 105, its portion filling the opening 104a and extending on the second insulating layer 104 becomes the upper electrode 11b in FIG. 1A and FIG. 1B and the appended part 4 integrally formed with the upper electrode 11b. Its portion filling the opening 104a and connected to the first conductive layer 103 (the conductive layer 13 in FIG. 1B) becomes the connection portion 4a in FIG. 1B.

In the optical modulation device of this embodiment, directly under each of the capacitors 11, a capacitance component is present between the lower electrode 11a and the silicon substrate 111, but owing to the large junction capacitance of the PIN diode disposed in parallel to the capacitance component, an influence of a loss of the high-frequency current is small.

As described above, according to this embodiment, an influence by the capacitance between the upper electrode 11b of the capacitor 11, which is a constituent member of the structure 3 having the equalizer function, and the silicon substrate 111 is small, achieving a highly reliable optical modulation device in which the loss of the high-frequency current can be reduced.

Modification Example

A modification example of the first embodiment will be hereinafter described. This example discloses an optical modulation device similar to that of the first embodiment, but is slightly different from the first embodiment in a peripheral structure of a capacitor which is a constituent member of a structure having an equalizer function.

Figure 5A:
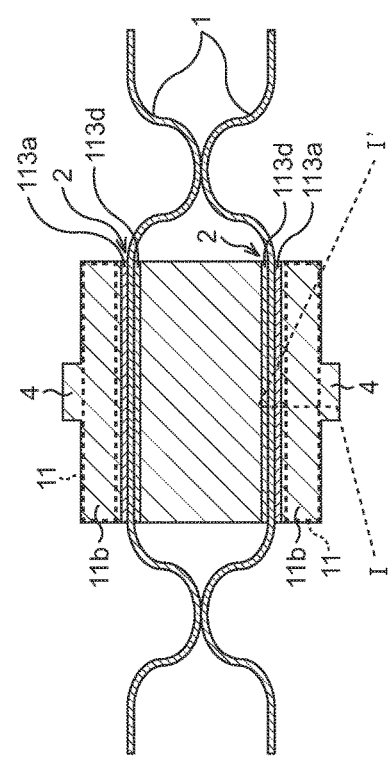
FIG. 5A and FIG. 5B are schematic views illustrating the rough structure of an optical modulation device according to a modification example of the first embodiment.
Figure 5B:
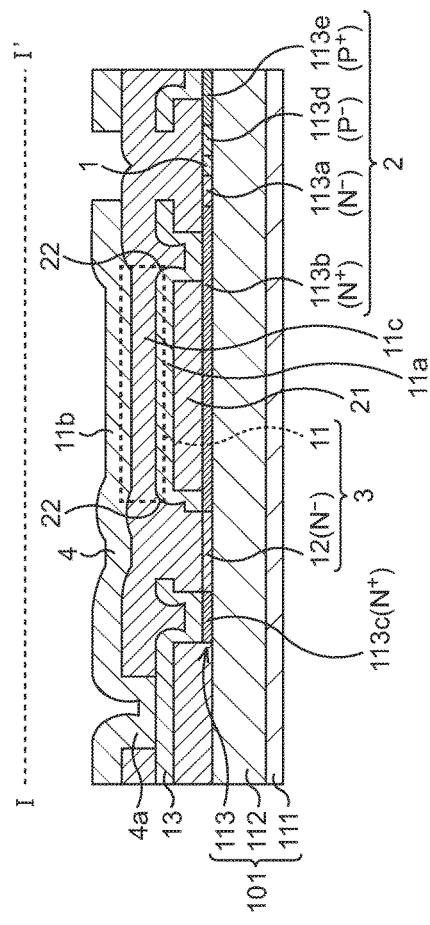

FIG. 5A is a schematic plane view illustrating the rough structure of the optical modulation device according to the modification example of the first embodiment, and FIG. 5B is a cross-sectional view taken along the broken line I-I' in FIG. 1A. The same constituent members as those of the optical modulation device according to the first embodiment are denoted by the same reference signs.

The optical modulation device includes: optical waveguide cores 1 constituting both arms of a Mach-Zehnder modulator; phase modulators 2 each provided on part of the optical waveguide core 1 and including a PIN diode; and structures 3 having an equalizer function.

The structures 3, which are for frequency response compensation, each have a capacitor 11 and a resistor 12 which is connected in parallel to the capacitor 11 and flattens a low-band frequency response.

The capacitor 11 is a parallel-plate capacitor and includes a lower electrode 11a, an upper electrode 11b, and a dielectric film 11c inserted between the lower and upper electrodes 11a, 11b. The lower and upper electrodes 11a, 11b are each formed of a conductive substance, for example, Al.

The optical waveguide cores 1, the phase modulators 2, and the resistors 12 are on a silicon layer 113 of a SOI substrate 101 (a stack of a silicon substrate 111, an insulating layer 112, and the silicon layer 113). In this embodiment, a side-wall grating optical waveguide is illustrated as an example of an optical waveguide including the optical waveguide core 1 and the phase modulator 2. The optical waveguide may be a rib optical waveguide instead of the side-wall grating optical waveguide.

The optical waveguide core 1 is a non-doped region of the silicon layer 113. An N-type region and a P-type region, which sandwich the optical waveguide core 1, are formed of impurities implanted into the silicon layer 113. The N-type region includes a low-concentration N-type region 113a, a high-concentration N-type region 113b, a low-concentration N-type region as the resistor 12, and a high-concentration N-type region 113c. The P-type region includes a low-concentration P-type region 113d and a high-concentration P-type region 113e. The phase modulator 2 includes the low-concentration N-type region 113a (fin-shaped), the high-concentration N-type region 113b, the low-concentration P-type region 113d (fin-shaped), and the high-concentration P-type region 113e. In the optical waveguide core 1 and the phase modulator 2, PIN junction is formed.

In this embodiment, appended parts 4 are formed integrally with the respective upper electrodes 11b of the capacitors 11. The appended parts 4 are each formed of the same material as that of the upper electrode 11b and are each electrically connected to the resistor 12. The appended parts 4 each have a smaller area than the area of the capacitor 11 (for example, the area of the upper electrode 11b, which is equal in area to the lower electrode 11a in the capacitor 11). Specifically, the capacitor 11 has an about 250 µm lateral length which is equal to that of the phase modulator 2, and has an about 60 µm vertical length. On the other hand, the appended part 4 has an about 10 µm lateral length and an about 3 µm vertical length. A conductive layer 13 is connected to the resistor 12. The appended part 4 includes a connection portion 4a connected to the conductive layer 13, for electrical connection to the resistor 12.

Since the appended part 4 is smaller than the capacitor 11, the capacitance generated between the appended part 4 and the SOI substrate 101 is sufficiently smaller than the capacitance of the capacitor 11, ensuring that an inputted high-frequency current flows toward the resistor 12. This reduces a loss of the high-frequency current.

In this example, a raised part 21 formed of an insulator is between the silicon layer 113 and the lower electrode 11a. Due to the presence of the raised part 21, the lower electrode 11a is formed to cover the raised part 21. At this time, edge portions 22 of the lower electrode 11a are formed to gently curve downward without protruding upward. This ensures that a predetermined distance is kept between the edge portions 22 of the lower electrode 11a and the upper electrode 11b to prevent accidental contact of the edge portions 22 with the upper electrode 11b.

To form the raised part 21, when the first insulating layer 102 is processed in the process in FIG. 2D described in the first embodiment, the first insulating layer 102 is left on the high-concentration N-type region 113b. The remaining first insulating layer 102 becomes the raised part 21.

As described above, according to this example, an influence by the capacitance between the upper electrode 11b of the capacitor 11, which is a constituent member of the structure 3 having the equalizer function, and the silicon substrate 111 is small, achieving a highly reliable optical modulation device in which a loss of the high-frequency current can be reduced.

Second Embodiment

A second embodiment will be hereinafter described. This embodiment discloses an optical modulation device similar to that of the first embodiment, but is slightly different from the first embodiment in the shape of a capacitor which is a constituent member of a structure having an equalizer function. The modification example of the first embodiment is also applicable to this embodiment, and in the following example, an optical modulation device to which the modification example is applied will be described.

Figure 6A:
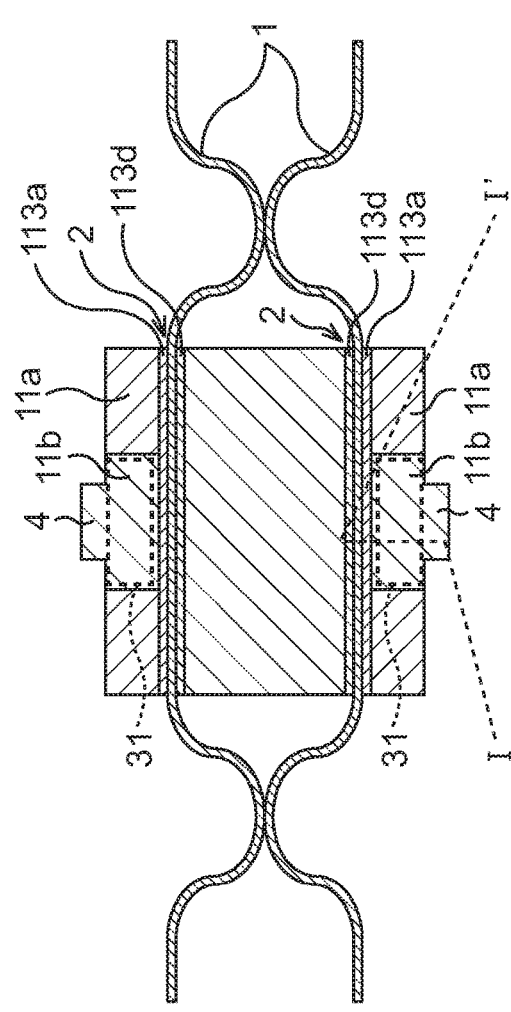
FIG. 6A and FIG. 6B are schematic views illustrating the rough structure of an optical modulation device according to a second embodiment.
Figure 6B:
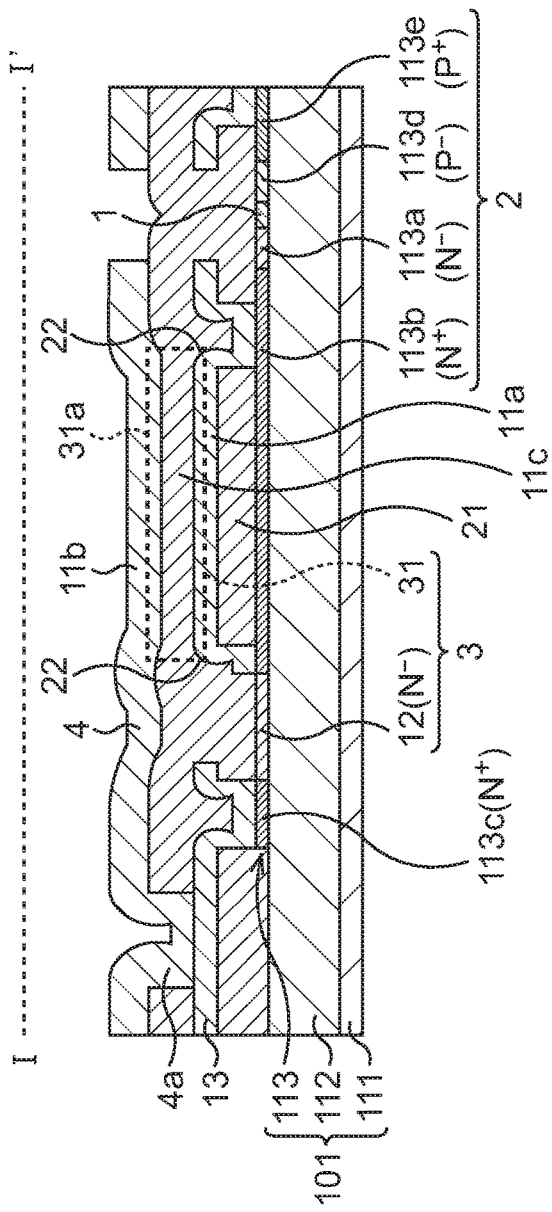

FIG. 6A is a schematic plane view illustrating the rough structure of the optical modulation device according to the second embodiment and FIG. 6B is a cross-sectional view taken along the broken line I-I' in FIG. 6A. The same constituent members as those of the optical modulation device according to the modification example of the first embodiment are denoted by the same reference signs. In FIG. 6A, a dielectric film 11c is not illustrated.

The optical modulation device includes: optical waveguide cores 1 constituting both arms of a Mach-Zehnder modulator; phase modulators 2 each provided on part of the optical waveguide core 1 and including a PIN diode; and structures 3 having an equalizer function.

The structures 3, which are for frequency response compensation, each include a capacitor 31 and a resistor 12 which is connected in parallel to the capacitor 31 and flattens a low-band frequency response.

The capacitor 31 is a parallel-plate capacitor and includes a lower electrode 11a, an upper electrode 31a, and the dielectric film 11c inserted between the lower and upper electrodes 11a, 31a. The lower and upper electrodes 11a, 31a are each formed of a conductive substance, for example, Al. In this embodiment, the upper electrode 31a is smaller than the lower electrode 11a and is enclosed in the lower electrode 11a in a plane view, and a portion corresponding to the size of the upper electrode 31a is the capacitor 31. For example, the capacitor 31 has the same area as that of the capacitor 11 of the first embodiment to have an equal capacitance to that of the capacitor 11 in the first embodiment.

The optical waveguide cores 1, the phase modulators 2, and the resistors 12 are on a silicon layer 113 of a SOI substrate 101 (a stack of a silicon substrate 111, an insulating layer 112, and the silicon layer 113). In this embodiment, a side-wall grating optical waveguide is illustrated as an example of an optical waveguide including the optical waveguide core 1 and the phase modulator 2. The optical waveguide may be a rib optical waveguide instead of the side-wall grating optical waveguide.

The optical waveguide core 1 is a non-doped region of the silicon layer 113. An N-type region and a P-type region, which sandwich the optical waveguide core 1, are formed of impurities implanted into the silicon layer 113. The N-type region includes a low-concentration N-type region 113a, a high-concentration N-type region 113b, a low-concentration N-type region as the resistor 12, and a high-concentration N-type region 113c. The P-type region includes a low-concentration P-type region 113d and a high-concentration P-type region 113e. The phase modulator 2 includes the low-concentration N-type region 113a (fin-shaped), the high-concentration N-type region 113b, the low-concentration P-type region 113d (fin-shaped), and the high-concentration P-type region 113e. In the optical waveguide core 1 and the phase modulator 2, PIN junction is formed.

In this embodiment, appended parts 4 are formed integrally with the respective upper electrodes 31a of the capacitors 31. The appended parts 4 are each formed of the same material as that of the upper electrode 31a and are each electrically connected to the resistor 12. The appended parts 4 each have a smaller area than the area of the capacitor 31 (the area of the upper electrode 31a, which is smaller in area than the lower electrode 11a in the capacitor 31). Specifically, the upper electrode 31a has an about 150 µm lateral length and an about 100 µm vertical length. On the other hand, the appended part 4 has an about 10 µm lateral length and an about 3 µm vertical length. A conductive layer 13 is connected to the resistor 12. The appended part 4 includes a connection portion 4a connected to the conductive layer 13, for electrical connection to the resistor 12.

Since the appended part 4 is smaller than the capacitor 31, the capacitance generated between the appended part 4 and the SOI substrate 101 is sufficiently smaller than the capacitance of the capacitor 31, ensuring that an inputted high-frequency current flows toward the resistor 12. This reduces a loss of the high-frequency current.

As described above, according to this embodiment, an influence by the capacitance between the upper electrode 31a of the capacitor 31, which is a constituent member of the structure 3 having the equalizer function, and the silicon substrate 111 is small, achieving a highly reliable optical modulation device in which a loss of the high-frequency current can be reduced.

Third Embodiment

A third embodiment will be hereinafter described. This embodiment discloses an optical modulation device similar to that of the first embodiment, but is different from the first embodiment in that a structure having an equalizer function in this embodiment does not have a resistor as its constituent member. The modification example of the first embodiment is also applicable to this embodiment, and in the following example, an optical modulation device to which the modification example is applied will be described.

Figure 7A:
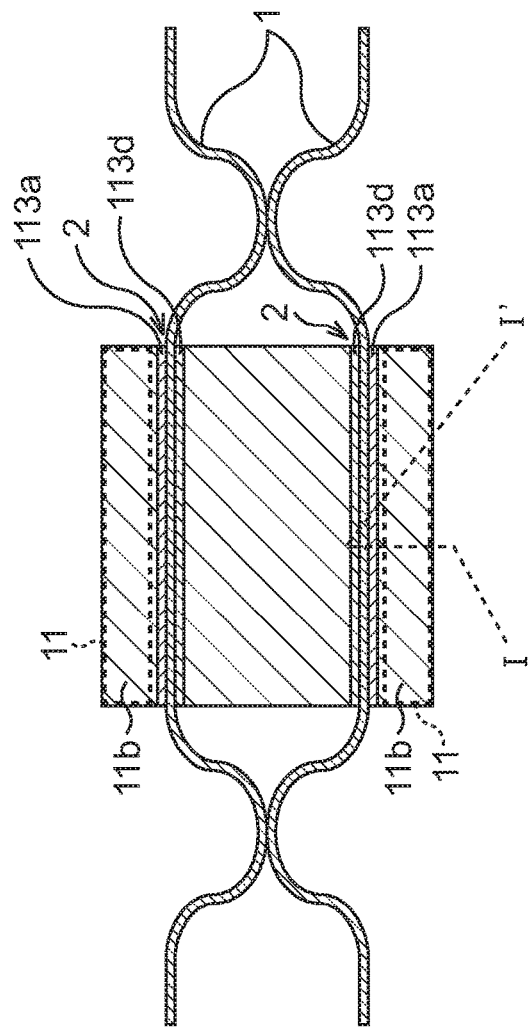
FIG. 7A and FIG. 7B are schematic views illustrating the rough structure of an optical modulation device according to a third embodiment.
Figure 7B:
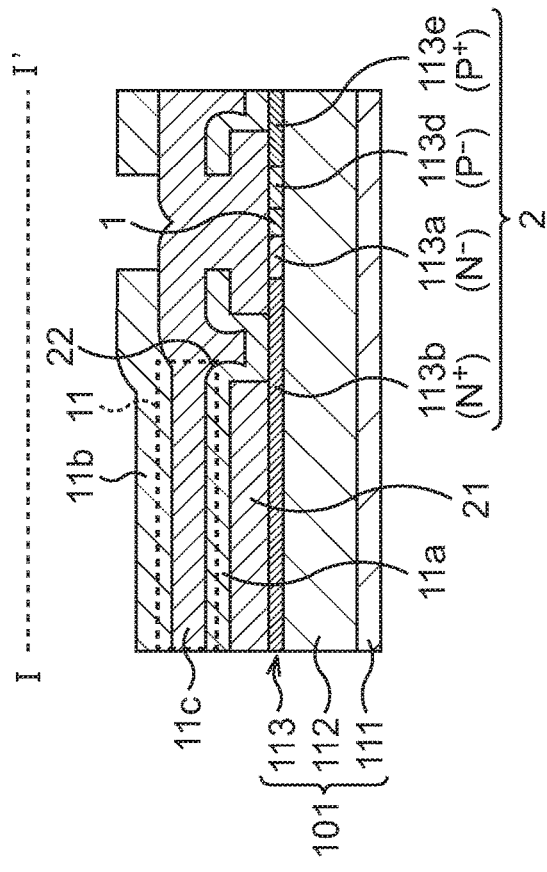

FIG. 7A is a schematic plane view illustrating the rough structure of the optical modulation device according to the third embodiment and FIG. 7B is a cross-sectional view taken along the broken line I-I' in FIG. 7A. The same constituent members as those of the optical modulation device according to the modification example of the first embodiment are denoted by the same reference signs.

The optical modulation device includes: optical waveguide cores 1 constituting both arms of a Mach-Zehnder modulator; phase modulators 2 each provided on part of the optical waveguide core 1 and including a PIN diode; and structures 3 having an equalizer function.

The structures 3, which are for frequency response compensation, each include a capacitor 11. In this embodiment, the structure 3 does not include a resistor 12.

The capacitor 11 is a parallel-plate capacitor and includes a lower electrode 11a, an upper electrode 11b, and a dielectric film 11c inserted between the lower and upper electrodes 11a, 11b. The lower and upper electrodes 11a, 11b are each formed of a conductive substance, for example, Al.

The optical waveguide cores 1, the phase modulators 2, and the resistors 12 are on a silicon layer 113 of a SOI substrate 101 (a stack of a silicon substrate 111, an insulating layer 112, and the silicon layer 113). In this embodiment, a side-wall grating optical waveguide is illustrated as an example of an optical waveguide including the optical waveguide core 1 and the phase modulator 2. The optical waveguide may be a rib optical waveguide instead of the side-wall grating optical waveguide.

The optical waveguide core 1 is a non-doped region of the silicon layer 113. An N-type region and a P-type region, which sandwich the optical waveguide core 1, are formed of impurities implanted into the silicon layer 113. The N-type region includes a low-concentration N-type region 113a, a high-concentration N-type region 113b, a low-concentration N-type region as the resistor 12, and a high-concentration N-type region 113c. The P-type region includes a low-concentration P-type region 113d and a high-concentration P-type region 113e. The phase modulator 2 includes the low-concentration N-type region 113a (fin-shaped), the high-concentration N-type region 113b, the low-concentration P-type region 113d (fin-shaped), and the high-concentration P-type region 113e. In the optical waveguide core 1 and the phase modulator 2, PIN junction is formed.

In this embodiment, the structure 3 having the equalizer function includes only the capacitor 11 and does not include a resistor. This eliminates a need for an appended part for the connection to the resistor, and thus there is no appended part extending from the upper electrode 11b. This structure surely prevents a loss of a high-frequency current.

Fourth Embodiment

A fourth embodiment will be hereinafter described. This embodiment discloses an optical modulation device including a driver circuit which drives phase modulators 2. The optical modulation device may be any one of the first to third embodiments and the modification example, but in the following example, an optical modulation device to which the modification example of the first embodiment is applied will be described.

Figure 8A:
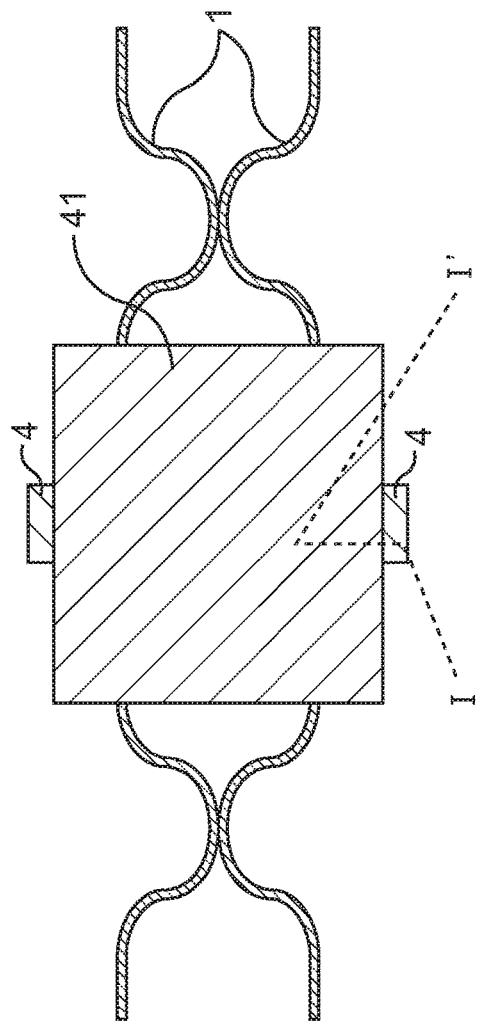
FIG. 8A and FIG. 8B are schematic views illustrating the rough structure of an optical modulation device according to a fourth embodiment.
Figure 8B:
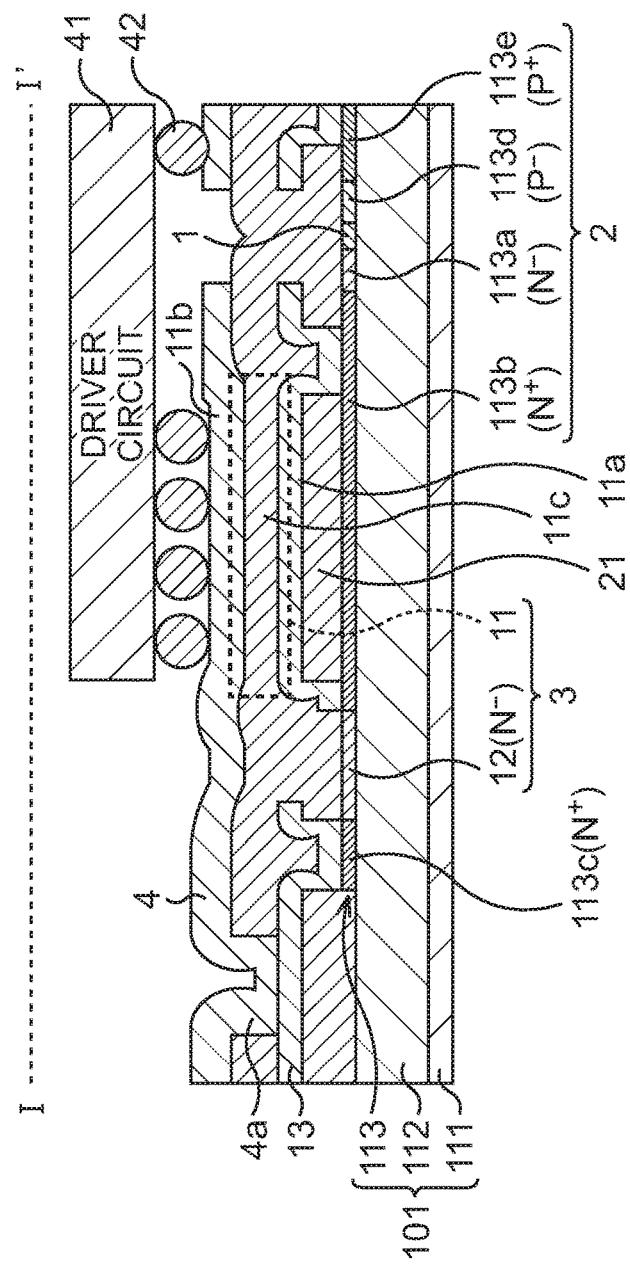

FIG. 8A is a schematic plane view illustrating the rough structure of the optical modulation device according to the fourth embodiment, and FIG. 8B is a cross-sectional view taken along the broken line I-I' in FIG. 8A. The same constituent members as those of the optical modulation device according to the modification example of the first embodiment are denoted by the same reference signs.

In the optical modulation device, a driver circuit 41 which drives the phase modulators 2 is loaded directly above the capacitors 11. The driver circuit 41 is electrically connected to the upper electrodes 11 and so on through a ball grid array 42.

According to this embodiment, an influence by the capacitance between the upper electrode 11b of the capacitor 11, which is a constituent member of the structure 3 having the equalizer function, and the silicon substrate 111 is small, achieving a highly reliable optical modulation device in which a loss of the high-frequency current can be reduced.

The optical modulation device according to the fourth embodiment is used in, for example, a transceiver. In this case, the transceiver includes, for example, a laser at one end of the optical waveguide core 1, and for example, SOA (Semiconductor Optical Amplifier) and an output optical waveguide at the other end.

As one aspect, in the optical modulation device, the influence by the capacitance between the electrode of the capacitor, which is the constituent member of the structure having the equalizer function, and the substrate is small, and thus the loss of the high-frequency current can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulation device, comprising:
   a silicon substrate;
   a silicon optical waveguide formed above the silicon substrate;
   a phase modulator disposed on part of the silicon optical waveguide;
   a capacitor connected to the phase modulator and including a lower electrode and an upper electrode;
   a resistor connected in parallel to the capacitor;
   an appended part integrated with the upper electrode and connected to the resistor; and
   an insulating layer provided between the phase modulator and the lower electrode disposed above the phase modulator, at a position included in the capacitor in a plane view,
   wherein the appended part is smaller in area than the capacitor.

2. The optical modulation device according to claim 1, further comprising a conductive layer connected to the resistor,
   wherein the appended part includes a connection portion connected to the conductive layer.

3. The optical modulation device according to claim 1, wherein the upper electrode is smaller in area than the lower electrode.

4. An optical modulation device, comprising:
   a silicon substrate;
   a silicon optical waveguide formed above the silicon substrate;
   a phase modulator disposed on part of the silicon optical waveguide;
   a capacitor connected to the phase modulator and including a lower electrode and an upper electrode;
   a resistor connected in parallel to the capacitor;
   an appended part integrated with the upper electrode and connected to the resistor; and
   a driver circuit which is disposed directly above the capacitor and drives the phase modulator,
   wherein the appended part is smaller in area than the capacitor.

* * * * *